US005693356A

United States Patent [19]
Mandava et al.

[11] Patent Number: 5,693,356
[45] Date of Patent: Dec. 2, 1997

[54] PROCESS FOR PREPARING GELLED MEAT CHUNKS

[75] Inventors: Rao Mandava, Helsingborg, Sweden; Isabel Fernandez, Montbazon; Marcel Alexandre Juillerat, Fondettes, both of France

[73] Assignee: Nestec S.A., Vevey, Switzerland

[21] Appl. No.: 671,693

[22] Filed: Jun. 28, 1996

[30] Foreign Application Priority Data

Jun. 30, 1995 [EP] European Pat. Off. ............ 95810436

[51] Int. Cl.⁶ .................. A23L 1/0528; A23L 1/314; A23L 1/317
[52] U.S. Cl. .................. 426/574; 426/641; 426/646
[58] Field of Search ............ 426/641, 646, 426/574

[56] References Cited

U.S. PATENT DOCUMENTS

| | | |
|---|---|---|
| 4,427,704 | 1/1984 | Cheney et al. ............ 426/104 |
| 4,876,103 | 10/1989 | Kawano et al. ............ 426/574 |
| 5,358,731 | 10/1994 | Sakamoto et al. ............ 426/646 X |

FOREIGN PATENT DOCUMENTS

| | | |
|---|---|---|
| 0290251 | 11/1988 | European Pat. Off. . |
| 2224629A | of 1990 | United Kingdom . |

OTHER PUBLICATIONS

Dialog Database Abstract, Accession No. 00536322, of Shoten, et al., Japanese Patent Document No. JP-A-55 023922 (1980).

Dialog Database Abstract, Accession No. 02958765, of Narasawa, Japanese Patent document No. JP-A-01 256365 (1990).

Dialog Database Abstract, Accession No. 00590279, of Seiichi Japanese Patent Document No. JP-A-55077879 (1980); and.

Dialog Database Abstract, Accession No. 03093664, of Kato, Japanese Patent Document No. JP-A-02 069164 (1990).

*Primary Examiner*—Arthur L. Corbin
*Attorney, Agent, or Firm*—Vogt & O'Donnell, LLP

[57] ABSTRACT

Meaty chunks are prepared by chopping and heating a meat material combined with water and konjac particles to obtain a heated emulsion, and then an alkali agent is added to the emulsion to raise the pH of the emulsion which then is heated to gel the emulsion to obtain a gel, and the gel is diced into chunks.

28 Claims, No Drawings

PROCESS FOR PREPARING GELLED MEAT CHUNKS

The present invention relates to a process for manufacturing meat chunks, particularly, preparation of gel chunks containing a meat material and more particularly a gel of a meat material emulsion.

Many uses of konjac gel or konjac paste in the preparation of processed foods are known, especially in the fields of oriental noodles or meat products such as terrines, hamburgers or sausages for example.

U.K. Patent Application No. GB 2 224 629A discloses the preparation of foodstuffs by adding a konjac paste having a pH of 9.0 to 10.3 to a food raw material such as minced meat or fish and then processing the mixture, the paste being made of 1 part of konjac dissolved and swollen in 20 to 40 parts of water, the pH of the paste being adjusted with an alkali agent such as carbonates of sodium, calcium and potassium, and basic amino acids.

U.S. Pat. No. 4,876,103 discloses a processed meat product comprising a shaped and then thermally treated mixture of a meat and a konjac gel, the konjac gel having been obtained by dissolving and swelling 1 part of konjac powder in 50 to 60 parts of water, adding to the paste a coagulant consisting of a mixture of calcium hydroxide, sodium carbonate and potassium carbonate, and steaming to coagulate the paste.

U.S. Pat. No. 4,427,704 discloses the preparation of a thermo-reversible or thermo-irreversible aqueous gelling system by subjecting a mixture comprising a food material, especially minced meat offal, water and a combination of carrageenan and a glucomannan, especially konjac, to a heat treatment at a pH below 8.0.

European Patent Application Publication No. 0 290 251 A1 discloses the preparation of a thermo-irreversible aqueous gelling system by subjecting a mixture comprising a food material, especially minced meat offal, water and a combination of xanthan gum and a glucomannan gum, especially konjac, at a pH between 6.0 and 10.0, more especially between 6.5 and 8.0 to a heat treatment under conditions of temperature and time to cause the gel to become thermo irreversible.

SUMMARY OF THE INVENTION

The purpose of the present invention is to provide a process involving the use of konjac only and no other gum for manufacturing konjac gel-containing meat chunks which have a firm and chewy texture and which are able to maintain this texture after sterilisation.

To this end, the process for manufacturing meat chunks according to the present invention comprises:

chopping and heating a mixture of meat material, water and konjac in order to get a meat emulsion, until the temperature of the emulsion reaches a value between 65° C. and 100° C., preferably between 85° C. and 95° C., adding an alkali agent to the emulsion for raising the pH of the emulsion to a value between 8.0 and 11.0, preferably between 9.0 and 10.0, gelifying the emulsion by heating the emulsion up to a temperature between 65° C. and 100° C., preferably between 90° C. and 100° C. and maintaining this temperature for 5 to 60 min, preferably for 20 to 40 min, and dicing the gelled emulsion into chunks.

By proceeding in accord with the foregoing process, it was found that it was possible in this way to prepare meat chunks which had a firm and chewy texture which could be maintained even after a severe heat treatment corresponding to a sterilisation.

In other words, it was found possible in this way, with the use of konjac only and no other gum, to manufacture meat chunks which not only contained an amount of between about 25% and 75% of added water beside said meat material and optionally fat but which also had a surprisingly chewy and firm texture, and which were actually heat stable.

These chunks were also easy to dice even hot. Moreover, after having been reheated or further heated to a temperature and for a time corresponding to a sterilisation step, they surprisingly appeared not only to have entirely maintained their chewy and firm texture but also to have lost any alkalinity, which means they appeared to have a neutral pH, namely a pH between 6.0 and 7.5. Moisture loss or gain was slight upon sterilisation.

A possible explanation of the success of the present process may be that it is due to a subtle and adequate exploitation of the buffering capacity of the meat.

Indeed, it was found that when the alkali agent was added into the meat material together with konjac from the beginning and the whole mixture was heated, the emulsion broke down and did not gel. However, when the alkali was added after the mixture was heated, it was possible to gel the mixture by further heating it. As to the drop of pH observed during the optional sterilisation step, it could possibly be due to a Maillard reaction which is more enhanced at higher temperatures and longer times.

DETAILED DESCRIPTION OF THE INVENTION

Throughout the present specification and claims the term "konjac" means the glucomannan found in the tubers of perennial herbs of the Amorphophallus species, especially *A. konjac*, *A. oncophyllus* and *A. variabilis*, in a crude form such as the dried and pulverised tubers or in a purified form.

The expression "firm and chewy texture" means a texture which allows a diced chunk to be felt in the mouth as an individual piece of gelified product which may be easily and properly scrunched and which is neither brittle, nor hard, nor mushy, nor sticky.

For carrying out the process of the present invention it is possible to choose said meat material from a group comprising offal, especially liver, heart, kidneys or viscera; meat, especially mechanically deboned meat of beef, pork and/or poultry; animal fat; and/or fish meat or fish material including bones and/or viscera, for example.

It is possible to combine the meat material and water to prepare a mixture comprising meat material and water in a proportion between 80:20 to 25:75 parts by weight. For increasing the water content of the mixture beyond about 30%, it may be useful to add fat and/or starch to the mixture. The optional addition of fat, in an amount of up to about 20%, preferably in an amount of 3 to 6%, was found to be surprisingly effective in binding more water and for improving the gelation. The optional addition of starch, in an amount of up to about 10%, effectively allowed binding of more water.

It is possible to combine the meat material and water to prepare a mixture comprising between 0.5% and 3.0% of konjac. A konjac content in the lower part of this range may be convenient for mixtures having an added water content below about 30% without containing added fat, for example. A konjac content in the upper part of this range may be convenient for mixtures having an added water content of between about 30% and 60% without containing added fat, for example.

It is possible to prepare a mixture further comprising up to 1.0% of potassium and/or sodium chloride and up to 1.0% of sodium and/or potassium tripolyphosphate or any edible phosphates, especially diphosphates or orthophosphates, for example.

Chopping the mixture may be carried out in a bowl chopper or in a traditional meat cutter such as a Stephan cutter, for example. It was noticed that agitation, effected by chopping of the whole mixture, was necessary while heating it until its temperature reached a value between 65° C. and 100° C., preferably between 85° C. and 95° C., otherwise konjac particles remained as individual particles and did not make a continuous gel.

Then and only then, an alkali agent has to be added to the emulsion for raising its pH to a value between 8.0 and 11.0, preferably between 9.0 and 10.0. This alkali agent may be sodium carbonate, potassium carbonate, calcium carbonate, potassium hydroxide and/or sodium hydroxide, for example.

The emulsion, which has had its pH adjusted in this way, is then gelified by heating it up to a temperature between 65° C. and 100° C., preferably between 90° C. and 100° C. and maintaining this temperature for 5 to 60 min, preferably for 20 to 40 min. It was noticed that the pH had a negligible drop in value during this gelifying step. This enabled a really stable gel to be obtained.

The gelled emulsion is then diced into chunks. It was noticed that the gelled emulsion is able to be diced while it is hot, or also cold. This is a benefit for production operations.

It is also possible to further heat-sterilise such chunks at a temperature of from 120° C. to 140° C. for 2 min to 2 h. The present chunks indeed appeared to maintain their shape, structure and texture upon reheating as is usually done while retorting or sterilising in a pressure cooker, for example.

EXAMPLES

The process according to the present invention is described in greater detail in the examples presented below by way of illustration.

In these examples, the percentages are given by weight. The raw materials were pork liver and pork back-fat. The water was deionised water. Konjac was the powder sold by the company Sahacol Food Supplies Ltd, Thailand under the trade name SAHACOL. Xanthan was the product sold by the company Meyhall Chemical AG, Switzerland under the trade name RHODIGAL. Starch was the product sold by the company Roquette, France under the trade name CLEARAM MH10. Other ingredients were potassium chloride (KCl), sodium tripolyphosphate (STPP, $Na_2P_3O_{10}$), potassium carbonate ($K_2CO_3$) and sodium hydroxyde (NaOH).

The equipment used was a Stephan cutter (type VM 60), a Mado grinder (type "primus"), cans 7 cm×7 cm height× diameter and a ROTOMAT sterilisator (type pilot-rotor 400 from STOCK).

Comparative Example

In accordance with the process disclosed by U.K. Patent Application No. GB 2 224 629 A konjac was hydrated with water and different amounts of NaOH were added to it in order to raise its pH to 9.90, 10.25 and 11.20.

70% ground liver, to which was added 0.5% KCl and 0.5% STPP, was chopped at speed 1 for 2 min. Then the konjac paste (1.5% konjac+27.5% water+NaOH) was added and the mixture was chopped at speed 3 and heated in order to get a liver emulsion, until the temperature of the emulsion reached 90° C.

The emulsion was filled in cans and sterilised at 130° C. for 1 h. The resulting gel was brittle and had much water separation. The addition of alkaline konjac (pH 9.90, 10.25 and 11.20) indeed only had raised the pH of the liver mixture to just about 6.50.

Examples 1, 2 and 3

Ground liver and optionally pork back-fat in pieces about 4 mm in size, KCl, STPP and Konjac were placed in a Stephan cutter and chopped at speed 1 for 1 min. Water and optionally starch were then added. The whole mixture was heated and simultaneously chopped in order to get an emulsion and until the temperature of the emulsion reached 90° C.

Potassium carbonate ($K_2CO_3$) was then added and chopping was continued for another 2 min. Chopping was then stopped but heating was continued until the temperature of the emulsion reached 98° C.

The emulsion was then gelfied by maintaining this temperature for 30 min and the gelified emulsion was diced into cubic chunks while it was hot.

The chunks were sterilised in cans filled with 1 part of chunks and 4 parts of water, at 130° C. for 1 h. After cooling, the cans were opened and the chunks were examined and analysed.

The pH of the chunks was measured both after heating at 98° C. and at 130° C., with a Beckman pH meter (model 45) fitted with a glass electrode, after having homogenised the chunks with water.

The lightness (L) of the chunks was measured after sterilisation, with a Minolta Chromameter (model CR 300).

The texture of the chunks was measured with an Instron Universal Testing Machine (type 1141), using a compression test. To this end, the chunks were cored into samples 1.4 cm in diameter and 1.5 cm in height and the force necessary for compressing them to 70% of their initial height was measured and expressed in N.

The heat-stability of the chunks was observed visually after sterilisation and was also characterized by their percentage loss or gain of weight during sterilisation. The latter was defined as the weight of the chunks before sterilisation minus the weight of the chunks after sterilisation divided by the weight of the chunks before sterilisation and the result was multiplied by 100.

The results of three different trials carried out in the same way with mixtures having three different compositions are reported in Table I hereafter.

TABLE I

|  | Example 1 | Example 2 | Example 3 |
|---|---|---|---|
| Composition of the mixture (%) | | | |
| Liver | 70.0 | 40.0 | 40.0 |
| Fat | — | 5.0 | 5.0 |
| KCl | 0.5 | 0.5 | 0.5 |
| STPP | 0.5 | 0.5 | 0.5 |
| Konjac | 1.0 | 2.5 | 1.0 |
| Starch | — | — | 5.0 |
| $K_2CO_3$ | 0.9 | 0.8 | 1.0 |
| Water | 27.1 | 50.7 | 47.0 |

TABLE I-continued

|  | Example 1 | Example 2 | Example 3 |
| --- | --- | --- | --- |
| Results of analysis | | | |
| pH 98° C. | 9.48 | 9.34 | 9.45 |
| pH 130° C. | 6.71 | 6.90 | 7.02 |
| Weight gain or loss (%) | +15.30 | −5.73 | +10.66 |
| L-value | 34.98 | 41.81 | 43.05 |
| Hardness (N) | 8.35 | 9.24 | 3.67 |

The chunks obtained in Example 1, after gelifying at 98° C., had a rather light brown colour, were easy to dice even hot, showed no water separation and had a firm and chewy, nicely soft texture.

After sterilising at 130° C., these chunks had a rather dark brown colour. They had maintained their firm and chewy texture intact. Their pH had changed from alkaline to neutral, which is beneficial.

The chunks obtained in Example 2 were allowed to have a higher water content owing to the incorporation of fat and of a higher amount of konjac into their composition. After gelifying at 98° C. they also had a rather light brown colour, were easy to dice even hot, showed no water separation and had a firm and chewy, slightly harder texture.

After sterilising at 130° C., these chunks also had a slightly less dark brown colour. They had maintained their firm and chewy texture intact. Their pH had changed from alkaline to neutral, which is beneficial.

The chunks obtained in Example 3 were allowed to have a rather high water content owing to the incorporation of fat and starch (instead of a higher amount of konjac) into their composition. After gelifying at 98° C., they also had a rather light brown colour, were easy to dice even hot, showed no water separation and had a firm and chewy, slightly softer texture.

After sterilising at 130° C., these chunks also had a slightly less dark brown colour. They had maintained their firm and chewy texture intact. Their pH had changed from alkaline to neutral, which is beneficial.

We claim:

1. A process for preparing meaty chunks comprising:
   chopping and heating meat material and substances comprising water and konjac particles to obtain an emulsion having a temperature between 65° C. and 100° C.;
   adding an alkali agent to the emulsion to obtain a pH-adjusted emulsion having a pH between 8.0 and 11.0;
   heating the pH-adjusted emulsion at a temperature between 65° C. and 100° C. for a period of from 5 minutes to 60 minutes to gel the emulsion to obtain a gel; and
   dicing the gel into chunks.

2. A process according to claim 1 wherein, by weight based upon the emulsion weight, the water is combined with the meat material so that the water is present in an amount of from about 25% to 75%.

3. A process according to claim 2 wherein the substances further comprise an additional substance selected from the group consisting of a fat, a starch and a combination thereof.

4. A process according to claim 3 wherein the water is present in an amount of from about 30% to 75%.

5. A process according to claim 3 wherein the water is present in an amount of from about 30% to 75%, the additional substance is a fat and the fat is present in an amount of up to about 20%.

6. A process according to claim 3 wherein the water is present in an amount of from about 30% to 75%, the additional substance is a starch and the starch is present in an amount up to about 10%.

7. A process according to claim 3 wherein the water is present in an amount of from about 30% to 75%, the additional substance is a combination of fat and starch, and the fat is present in an amount of up to about 20% and the starch is present in an amount of up to about 10%.

8. A process according to claim 3 wherein the meat material, water and konjac particles are chopped and heated so that the emulsion has a temperature between 85° C. and 95° C., wherein in the alkali agent is added to the emulsion to obtain a pH-adjusted emulsion having a pH between 9.0 and 10.0 and wherein the pH-adjusted emulsion is heated at a temperature between 90° C. and 100° C.

9. A process according to claim 8 wherein the pH-adjusted emulsion is heated for from 20 minutes to 40 minutes.

10. A process according to claim 2 wherein, by weight based upon the emulsion weight, the konjac is present in an amount between 0.5% and 3.0%.

11. A process according to claim 1 wherein the substances further comprise an additional substance selected from the group consisting of a fat, a starch and a combination thereof.

12. A process according to claim 1 wherein, by weight based upon the emulsion weight, the konjac is present in an amount between 0.5%, and 3.0%.

13. A process according to claim 1 wherein the meat material, water and konjac particles are chopped and heated so that the emulsion has a temperature between 85° C. and 95° C.

14. A process according to claim 1 wherein the alkali agent is added to the emulsion to obtain a pH-adjusted emulsion having a pH between 9.0 and 10.0.

15. A process according to claim 1 wherein the pH-adjusted emulsion is heated at a temperature between 90° C. and 100° C.

16. A process according to claim 15 wherein the pH-adjusted emulsion is heated for from 20 minutes to 40 minutes.

17. A process according to claim 1 wherein the meat material, water and konjac particles are chopped and heated so that the emulsion has a temperature between 85° C. and 95° C., wherein the alkali agent is added to the emulsion to obtain a pH-adjusted emulsion having a pH between 9.0 and 10.0 and wherein the pH-adjusted emulsion is heated at a temperature between 90° C. and 100° C.

18. A process according to claim 17 wherein the pH-adjusted emulsion is heated for from 20 minutes to 40 minutes.

19. A process according to claim 1 wherein the meat material is selected from the group consisting of pieces of offal, animal meat other than offal, fish meat and fish bones.

20. A process according to claim 1 wherein the meat material is offal, and the offal is selected from the group consisting of liver, heart, kidneys and viscera.

21. A process according to claim 1 wherein the meat material is deboned meat pieces selected from the group consisting of pieces of beef, pork, and poultry.

22. A process according to claim 1 wherein the substances comprise a further substance which is in an amount, by weight based upon the emulsion weight, of up to 1.0% and selected from the group consisting of potassium chloride, sodium chloride, and an edible phosphate.

23. A process according to claim 22 wherein the further substance is an edible phosphate and is selected from the group consisting of sodium tripolyphosphate and potassium tripolyphosphate.

24. A process according to claim 1 wherein the alkali agent is selected from the group consisting of sodium carbonate, potassium carbonate, calcium carbonate, potassium hydroxide and sodium hydroxide.

25. A process according to claim 1 further comprising heating the chunks at a temperature of from 120° C. to 140° C. for from 2 minutes to 2 hours to sterilize the chunks.

26. A process according to claim 1 wherein the meat material and substances, the emulsion and the pH-adjusted emulsion do not comprise a gum other than konjac.

27. A process according to claim 1 wherein the meat material and substances chopped and heated do not comprise an alkali agent.

28. A process according to claim 1 wherein the emulsion to which the alkali agent is added has a pH less than 8.0.

* * * * *